US 6,580,772 B2
Jun. 17, 2003

(54) METHOD OF FORMING CHANNEL ESTIMATE, AND RECEIVER

(75) Inventor: Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/983,773

(22) Filed: Oct. 25, 2001

(65) Prior Publication Data

US 2002/0097782 A1 Jul. 25, 2002

Related U.S. Application Data

(63) Continuation of application No. PCT/FI00/00369, filed on Apr. 27, 2000.

(30) Foreign Application Priority Data

Apr. 28, 1999 (FI) .................................................. 990965

(51) Int. Cl.[7] ................................................ H04B 1/10

(52) U.S. Cl. ..................... 375/350; 455/226.1; 455/67.1

(58) Field of Search ................................. 375/147, 150, 375/152, 344, 345, 350, 231, 232; 370/335, 441; 455/67.3, 67.4, 67.5, 226.1

(56) References Cited

U.S. PATENT DOCUMENTS 5,251,237 A * 10/1993 Baier .......................... 375/229
5,712,877 A    1/1998 Ho et al.
5,905,946 A * 5/1999 Lilleberg et al. ............ 370/441

FOREIGN PATENT DOCUMENTS

WO    WO 00/25530    5/2000

OTHER PUBLICATIONS

Asahara et al., "An Improved Pilot Symbol Assisted Coherent Detection Scheme for Rician Fading Channels," IEICE Trans. Commun. vol. E82–B, No. 12, Dec. 1999, pp. 2041–2048.

Kim et al., "New Rayleigh Fading Channel Estimator Based on PSAM Channel Sounding Technique," ICC '97 Montreol Towards the Knowledge Millenium, 1997 IEEE International Conference, Jun. 8–12, 1997, p. 1518–1520.

Mammela et al., "Prediction, Smoothing and Interpolation in Adaptive Diversity Reception," 1994 IEEE, pp. 475–478.

McLaughlin et al., "Performance Comparison of Least Squares and Least Mean Squares Algorithms as HF Channel Estimators," 1987 IEEE, pp. 2105–2108.

Clark et al., "Channel estimation for land mobile radio systems," IEE Proceedings, vol. 134, Pt. F, No. 4, Jul. 1987, pp. 383–393.

Clark et al., "Improved Channel Estimator for an HF Radio Link," 1983 Elsevier Science Publishers, Signal Processing 5, (1983) pp. 241–255.

(List continued on next page.)

*Primary Examiner*—Stephen Chin
*Assistant Examiner*—Kevin Kim
(74) *Attorney, Agent, or Firm*—Pillsbury Winthrop LLP

(57) ABSTRACT

The invention relates to a channel estimation method and a receiver for forming a channel estimate. The arrangement according to the invention comprises forming a preliminary channel estimate $c_k$ by multiplying a received sample $z_k$ by a known pilot symbol in a multiplier; forming a preliminary autocorrelation of preliminary channel estimates that are successive in time in multipliers; filtering preliminary autocorrelations by averaging in a filter, and forming filter parameters $\alpha_k$ to $\alpha_{k-m}$ in a filter on the basis of the averaged autocorrelation, and forming an average channel estimate by a filter section which forms a channel estimate and which is controlled by filter parameters $\alpha_k$ to $\alpha_{k-m}$.

34 Claims, 6 Drawing Sheets

OTHER PUBLICATIONS

Clark et al., "Channel Estimation for an HF Radio Link," IEE Proc. vol., 128, Pt. F, No. 1, Feb. 1981, pp. 33–42.*

Clark et al., "Adaptive Channel Estimator for an HF Radio Link," IEEE Transactions on Communications, vol. 37, No. 9, Sep. 1989, pp. 918–926.*

Clark et al., "Assessment of Kalman–Filter Channel Estimators for an HF Radio Link," IEE Proceedings, vol. 133, Pt. F, No. 6, Oct. 1986, pp. 513–521.*

Clayton et al., "Carrier Synchronisation Using Kalman Filters for Dynamic Doppler Shift Environments," King's College London, pp. 239–243.*

Fechtel et al., "An Investigation of Channel Estimation and Equalization Techniques for Moderately Rapid Fading HF–Channels," ICC '91, pp. 768–772.*

Haariharan et al., "HF Channel Estimation Using a Fast Transwersal Fiilter Algorithm," IEEE Transactions of Acoustics, Speech and Signal Processing, vol. 38, No. 8, Aug. 1990, pp. 1353–1362.*

* cited by examiner

METHOD OF FORMING CHANNEL ESTIMATE, AND RECEIVER

This application is a Continuation of International Application No. PCT/FI00/00369 filed on Apr. 27, 2000, which designated the U.S. and was published under PCT Article 21(2) in English.

FIELD OF THE INVENTION

The invention relates to formation of a channel estimate in a radio system comprising at least one base station and several terminal equipments.

BACKGROUND OF THE INVENTION

In a CDMA system, a base station or a terminal equipment operating as a receiver employs several channel estimation arrangements. However, channel estimates are usually filtered by a simple low-pass filter. The filter bandwidth is selected according to the maximum Doppler frequency. One of the problems of such a prior art arrangement is that the channel estimator has poor performance at low Doppler frequencies. Furthermore, such a channel estimator does not operate in a reliable manner if the power spectrum is clearly asymmetrical.

An optimum channel estimator could be implemented by the Wiener filter if the channel autocorrelation and the noise power spectral density were known. In practice they are not known but must be estimated. The implementation of the optimum Wiener filter in an actual receiver is further complicated by the elaborate matrix operations it requires and by errors in parameter estimation. In known adaptive channel estimators adaptivity is achieved by means of LMS (Least Mean Square), RLS (Recursive Least Squares) or Kalman algorithms. The LMS and RLS arrangements are disclosed in greater detail in the following publications: A. Mämmelä, V-P. Kaasila, Prediction, *Smoothing and Interpolation In Adaptive Diversity Reception*, ISSSTA'94, pp 475–478; S. Mclughlin, B. Mulgrew, C. F. N. Cowan, *Performance Comparison of Least Squares and Least Mean Squares Algorithms as HF Channel Estimators*, ICASSP'87, pp 2105–2108; A. P. Clark, S. G. Jayasinghe, *Channel Estimation for Land Mobile Radio Systems*, IEE Proceedings, Vol 134, Pt. F, No 4, July 1987, pp 383–393; A. P. Clark, F. McVerry, *Improved Channel Estimator for an HF Radio Link, Signal Processing*, Vol 5, No 3, May 1983, pp 241–255; A. P. Clark, F. McVerry, *Channel Estimation for an HF Radio Link*, IEE Proceedings, Vol 128, Pt. F, No 1, February 1981, pp 33–42; and A. P. Clark, S. Harihan, *Adaptive Channel Estimator for an HF Radio Link*, IEEE Transactions on Communications, Vol 37, No 9, September 1989, pp 918–926, which will be incorporated herein by reference.

The following publications: A. P. Clark, R. Harun, *Assessment of Kalman-filter Channel Estimators for an HF Radio Link*, IEE Proceedings, Vol 133, Pt. F, No 6, October 1986, pp 513–521; H. H. Clayton, P. Fines, A. H. Aghvami, *Carrier Synchronization Using Kalman Filters for Dynamic Doppler Shift Environments*, PIMRC'93, B2.7; S. A. Fechtel, H. Meyr, *An Investigation of Channel Estimation and Equalization Techniques for Moderately Rapid Fading HF-Channels*, ICC'91, pp 768–772; and S. Harihan, A. P. Clark, *HF Channel Estimation Using Fast Transversal Filter Algorithm*, IEEE Transactions on Acoustics, Speech, and Signal Processing, Vol 38. No 8, August 1990, pp 1353–1362, which will be incorporated herein by reference, describe the use of the Kalman filter in channel estimation.

The LMS and RLS algorithms have poor performance and they are not designed to operate at low or strongly negative signal-to-noise ratios. They are thus not suitable for a CDMA receiver. A problem with the adaptive Kalman algorithm is that it is complicated. Kalman algorithms, which adapt to the Doppler power spectrum and change their performance degree number, are too complicated for a practical application.

BRIEF DESCRIPTION OF THE INVENTION

An object of the invention is to provide a method and a receiver implementing the method so as to solve the aforementioned problems. This is achieved by a channel estimation method used in a CDMA radio system comprising at least one base station and several terminal equipments, which communicate with each other by transmitting and receiving signals, in which method a received signal is sampled and a pilot signal comprising pilot symbols is transmitted. The method according to the invention further comprises forming a preliminary channel estimate by multiplying a received sample by a known complex conjugate of a pilot symbol; forming a preliminary autocorrelation of preliminary channel estimates that are successive in time; filtering preliminary autocorrelations by averaging, and forming a filter parameter for filtration of an average channel estimate on the basis of the averaged autocorrelation; and forming an average channel estimate by channel estimate filtration, which is controlled by filter parameters.

The invention also relates to a receiver in a radio system comprising at least one base station and several terminal equipments, which comprise a transmitter and a receiver and which communicate with each other by transmitting and receiving signals including a pilot signal which comprises pilot symbols, the receiver being arranged to sample a received signal. The receiver is further arranged to form a preliminary channel estimate by multiplying a received sample by a known complex conjugate of a pilot symbol; to form a preliminary autocorrelation of preliminary channel estimates that are successive in time; to filter preliminary autocorrelations by averaging; to form a filter parameter for filtration of a channel estimate on the basis of the averaged autocorrelation; and to form an average channel estimate by channel estimate filtration which is arranged to be controlled by filter parameters.

The preferred embodiments of the invention are disclosed in the dependent claims.

The basic idea of the invention is that filter parameters or weighting coefficients of a channel filter are formed directly from autocorrelation functions of the channel estimates.

The method and the system according to the invention provide several advantages. Filter parameters are formed directly from the autocorrelation functions of the channel estimates with only a small amount of calculation and without complicated LMS, RLS or Kalman calculation operations for predicting the estimation error. Furthermore, since the channel estimator arrangement according to the invention does not utilize any prior data about the process to be estimated, the arrangement provides good performance for example with a clearly asymmetrical power spectrum. The arrangement according to the invention is also reliable at low signal-to-noise ratios.

BRIEF DESCRIPTION OF THE DRAWINGS

The invention will be described below in greater detail by means of the preferred embodiments with reference to the accompanying drawings, in which.

DETAILED DESCRIPTION OF THE INVENTION

The arrangement according to the invention is applicable particularly in a CDMA radio system, without being restricted thereto, however.

A radio system comprises at least one base station and several terminal equipments, which are usually mobile phones. A base station and a terminal equipment communicate with one another by transmitting and receiving for example a data signal and a pilot signal. A data signal usually consists of speech or other user data. A base station transmits on a control channel a pilot signal which is used in power control and synchronization. Signals comprise symbols, which can be presented and processed in a real or complex form. Symbols represent bits or bit combinations. Particularly in a CDMA radio system a signal propagates from the base station to a terminal equipment via several paths, and the signal components arrive at the receiver with different time delays.

Figure 1:
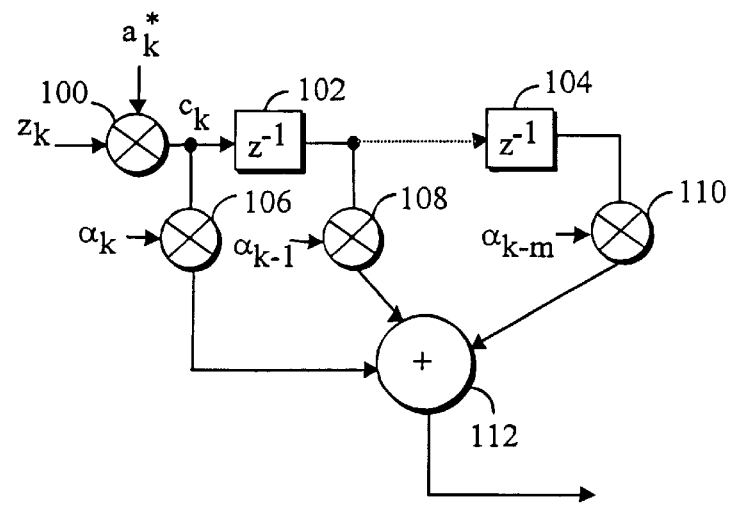
FIG. 1 is a block diagram of a predictive channel estimate filter.
Figure 2:
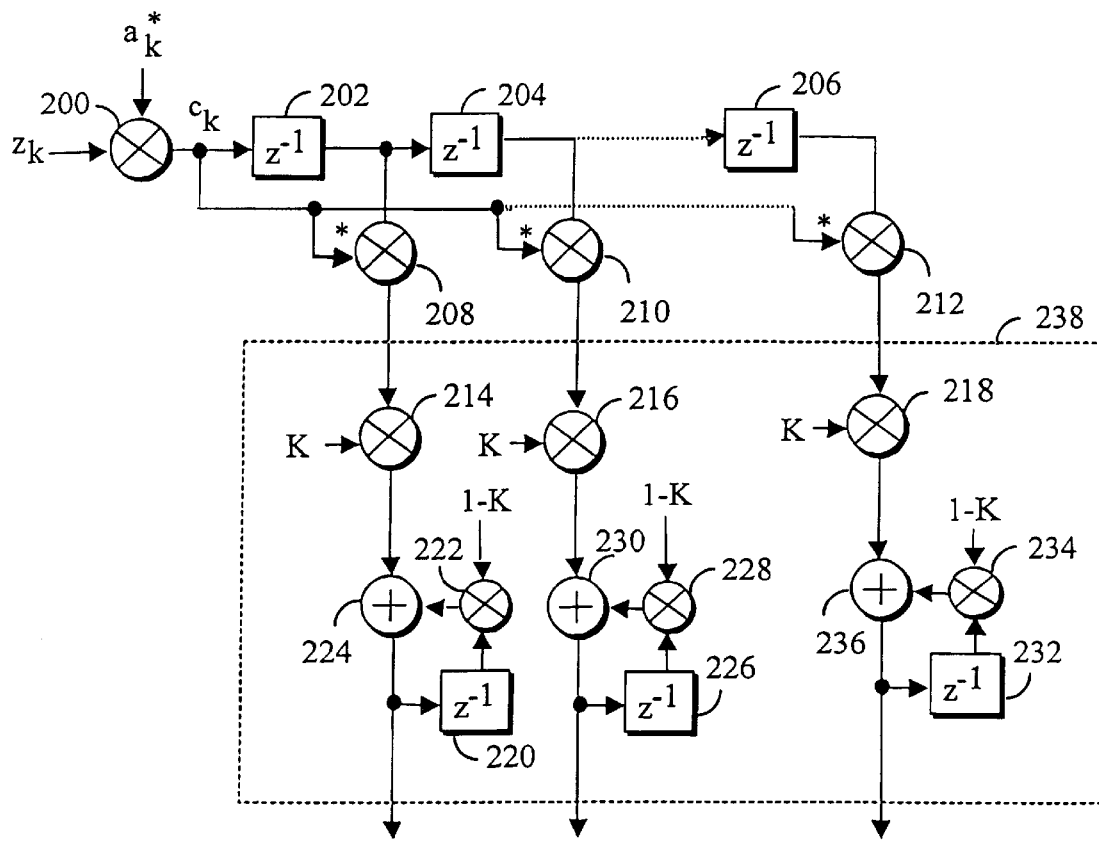
FIG. 2 is a block diagram of a filter for calculating filter parameters in a channel estimate filter.

Let us first examine an arrangement shown in FIGS. 1 and 2, which illustrates the principle of the invention. FIG. 1 shows a channel estimate filter which is based on a finite impulse response (FIR) filter. An incoming received signal sample $z_k$, which corresponds to a digital symbol, is multiplied in a multiplier 100 by a complex conjugate $a_k^*$ of a pilot symbol, which is a digital symbol that can be presented as a bit or a bit combination. The pilot symbol $a_k$ is known in advance. The received sample $z_k$ can be given in form $z_k = a_k \cdot c_k + n_k$, and $z_k$ can be multiplied by the complex conjugate of the pilot symbol to provide $z_k \cdot a_k^* = c_k + n_k$, where $n_k$ represents noise. If real symbols are used, the complex conjugate does not naturally change the symbol in any way. The multiplication provides a preliminary channel estimate $c_k$, which is delayed in every delay block 102 to 104 for a time corresponding to one symbol (the delay of one sample/symbol as a Z transformation can be denoted by $z^{-1}$). The number of the delay blocks 102 to 104 is selected freely so as to cover a particular delay area. Each preliminary channel estimate $c_k$ to $c_{k-m}$ is multiplied by a filter parameter $\alpha_k$ to $\alpha_{k-m}$ in multipliers 106 to 110. The filter parameters $\alpha_k$ to $\alpha_{k-m}$ weight the preliminary channel estimates $c_k$ to $c_{k-m}$. The weighted channel estimates are added together in a block 112 to provide an averaged channel estimate.

FIG. 2 shows a block diagram of a filter for calculating filter parameters $\alpha_k$ to $\alpha_{k-m}$ in a channel estimate filter, i.e. a filter parameter filter. Also in this arrangement a received sample $z_k$ is multiplied by the complex conjugate of the pilot symbol $a_k$ in a multiplier 200 and delayed in delay blocks 202 to 206, similarly as in FIG. 1. The obtained preliminary channel estimates $c_k$ to $c_{k-m}$ are correlated with a first preliminary channel estimate $c_k$ in blocks 208 to 212, which are preferably multipliers. Even though it is not necessary, at this stage the preliminary correlation results can be scaled or normalized for example such that each preliminary correlation is divided by the sum of all the preliminary correlations (such scaling or normalization is not shown in FIG. 2). Subsequently each preliminary autocorrelation result is multiplied by a forgetting factor K in multipliers 214 to 218, which are part of an averaging filter section 238. Let us examine below in greater detail the preliminary autocorrelation result $\hat{\theta}_{k,1}$. The autocorrelation result $\hat{\theta}_{k,1}$ is obtained by $\hat{\theta}_{k,1} = c_k \cdot c_{k-1}^*$, wherein i is index i=1, ... m, and subindex 1 denotes the first path I=1. The correlation result $\hat{\theta}_{k,1}$ proceeds to the filter section 238, where the autocorrelation is averaged by taking into account a finite or infinite number of correlation results $\hat{\theta}_{k,1}$. With the IIR (Infinite Impulse Response) filter shown in FIG. 2 the averaging is infinite (corresponds to infinite integration), whereas with the FIR filter the averaging would be finite (corresponding to integration from a particular moment in time to some other moment). The correlation result is first multiplied by the forgetting factor K, which has a value smaller than 1, for example between 0.001 and 0.01. Subsequently, the correlation result $(1-K) \cdot \hat{\rho}_{k,1,i}(t-1)$, which has already been filtered and weighted, is added in an adder 224 to the correlation result. The former correlation result has been obtained by delaying the correlation result in a delay block 220 and by multiplying the delayed correlation result by factor $1-K$ in a multiplier 222. Filter parameter $\alpha_k$ is thus obtained from the averaged correlation result $\hat{\rho}_{k,1,i} = (1-K) \cdot \hat{\rho}_{k,1,i}(t-1) + K \cdot \hat{\theta}_{k,1}(i)$. Filter parameter $\alpha_k$ can be identical with the filtered correlation $\alpha_k = \hat{\rho}_{k,1,i}$, but the filter parameter is more often a function of the filtered correlation $\alpha_k = f(\hat{\rho}_{k,1,i})$. The other filter parameters $\alpha_{k-1}$ to $\alpha_{k-m}$ are obtained correspondingly in blocks 226 to 232. In the arrangement of FIG. 2, filter parameters are formed specifically for each pilot symbol in each received sample, wherefore the more delay elements 102 to 104, and 202 to 206, and thus preliminary channel estimates are being used, the more complicated it is to form the filter parameters $\alpha_k$ to $\alpha_{k-m}$.

Figure 3:
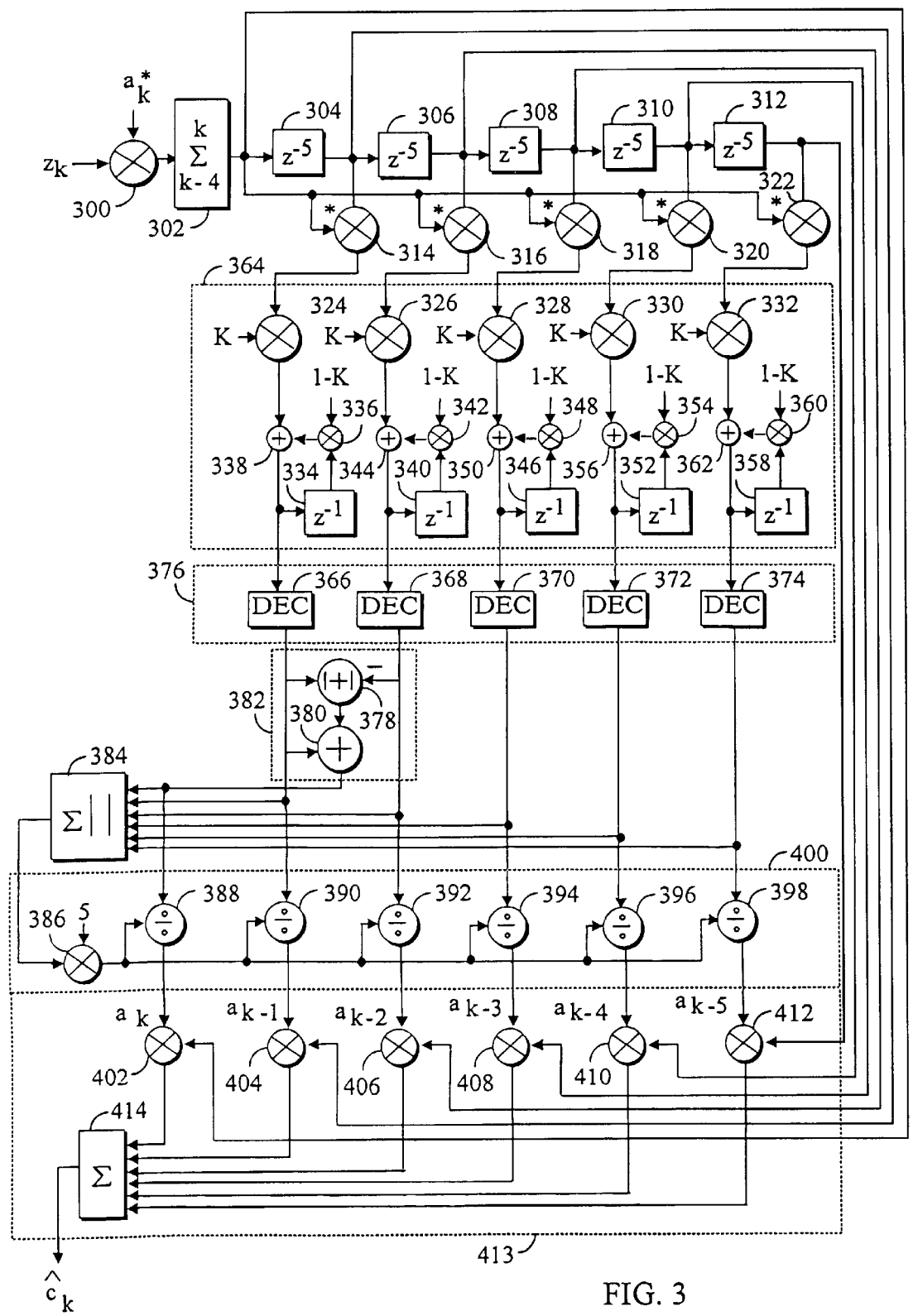
FIG. 3 is a block diagram of a predictive channel estimate filter according to the invention.

The calculation of the filter parameters $\alpha_k$ to $\alpha_{k-m}$ has been simplified in the arrangement according to the invention by combining several received samples $z_k$ and by thus calculating the filter parameters $\alpha_k$ to $\alpha_{k-m}$ less often. Such less frequent formation of the filter parameters $\alpha_k$ to $\alpha_{k-m}$ is shown in FIG. 3, where the process begins similarly as in FIGS. 1 and 2 by multiplying a received sample $z_k$ by the complex conjugate $a_k^*$ of the pilot symbol in a multiplier 300. The number of the preliminary channel estimates $c_k$ is thereafter decreased for example by 5, as shown in FIG. 3, by means of for instance averaging, which improves the signal-to-noise ratio. Delay blocks 304 to 312 thereafter delay the preliminary channel estimates at intervals of 5 symbols (as a Z transformation $z^{-5}$). The delayed channel estimates are subjected in multipliers 314 to 322 to preliminary autocorrelation for path I, i.e. $\hat{\theta}_{k,1}, \hat{\theta}_{k-1,1}, \hat{\theta}_{k-2,1}, \ldots, \hat{\theta}_{k-m,1}$, wherein preliminary channel coefficients, similarly as in FIGS. 1 and 2. Each preliminary autocorrelation $\hat{\theta}_{k,1}$, $\hat{\theta}_{k-1}, \hat{\theta}_{k-2,1}, \ldots, \hat{\theta}_{k-m,1}$ is filtered by finite or infinite averaging filtration in a filter section 364. FIG. 3 shows an IIR filter 364. Each preliminary autocorrelation $\hat{\theta}_{k,1}, \hat{\theta}_{k-1,1}, \hat{\theta}_{k-2,1}, \ldots, \hat{\theta}_{k-m,}$ is multiplied by factor K in multipliers 324 to 332. For example, to the preliminary correlation result $\hat{\theta}_{k-1,1}$ is added in an adder 344 the correlation result $(1-K) \cdot \hat{\rho}_{k-1,1,i}(t-1)$, which has already been filtered and weighted, and which has been obtained by delaying the correlation result in a delay block 340 and by multiplying the delayed correlation result by factor $1-K$ in a multiplier 342. The correlation results $\hat{\rho}_{k,1}, \hat{\rho}_{k-1,1}, \hat{\rho}_{k-2,1}, \ldots, \hat{\rho}_{k-m,1}$ which have been averaged by filtration thereafter proceed to a filter block 401, where the averaged correlation results $\hat{\rho}_{k,1}$, $\hat{\rho}_{k-1,1}, \hat{\rho}_{k-2,1}, \ldots, \hat{\rho}_{k-m,1}$ are decimated in a decimation block 376, the number of decimators 366 to 374 in the block being equal to the number of the delay blocks 304 to 312. Excessive sampling is thus reduced by using the decimators 366 to 374. Since an autocorrelation result cannot be formed for the latest symbol (symbol k) in the aforementioned blocks, this autocorrelation result is extrapolated from the earlier results in a block 382. Extrapolation is carried out for example by first calculating the absolute value difference between the two latest decimated correlation results $|\hat{\rho}_{k,1,1}(t) - \hat{\rho}_{k,1,2}(t)|$ in a block 380, whereafter the obtained result $|\hat{\rho}_{k,1,1}(t) - \hat{\rho}_{k,1,2}(t)|$ and the latest decimated correlation result $\hat{\rho}_{k,1,1}(t)$ are added together to form an absolute value sum $|\hat{\rho}_{k,1,1}(t) + |\hat{\rho}_{k,1,1}(t) - \hat{\rho}_{k,1,2}(t)||$ in the block 380. Subsequently the decimated correlation results are added together and an absolute value of the sum is formed in an adder block 384.

In a scaling block 400, which replaces the scaling of the preliminary correlations before the IIR filter, the results which have been added together are first multiplied in a multiplier 386 by the number of symbol summations, which in this case is 5. Each decimated correlation result $\hat{\rho}_{k,1,1}$, $\hat{\rho}_{k-1,1}, \hat{\rho}_{k-2,1}, \ldots, \hat{\rho}_{k-m,1}$ is divided in division block 388 to 398 by a sum result $$5 \sum_{i=0}^{M} |\hat{\rho}_{k,1,i}(t)|,$$

where M is the number of the correlation results to be added together (in this example 6), in order to obtain filter parameters $\alpha_k$ to $\alpha_{k-m}$. This can be presented as follows:

$$\alpha_{k,l}(i) = \frac{\hat{\rho}_{k,l,i(t)}}{5 \sum_{i=0}^{M} |\hat{\rho}_{k,l,i}(t)|}.$$

However, in a practical application it is possible not to calculate at all the term $$5 \sum_{i=0}^{M} |\hat{\rho}_{k,1,i}(t)|$$

in the divisor and not to perform the division, since it is sufficient to use a decimated correlation result $\hat{\rho}_{k,1}, \hat{\rho}_{k-1,1}$, $\hat{\rho}_{k-2,1}, \ldots, \hat{\rho}$hd k-m,1either directly as the filter parameter $\alpha_k$ to $\alpha_{k-m}$, or the filter parameter $\hat{\rho}_{k,1}, \hat{\rho}_{k-1,1}$, $\hat{\rho}_{k-2,1}, \ldots, \hat{\rho}_{k-m,1}$ can be scaled by a suitable number. The scaling block 400 is thus not absolutely necessary, or it can be replaced with multiplication by a constant.

When the filter parameters $\alpha_k$ to $\alpha_{k-m}$ have been formed, they proceed to a filter section (413), which forms the channel estimate, and the preliminary channel coefficients $c_k$ to $c_{k-m}$ are multiplied by the filter parameters $\alpha_k$ to $\alpha_{k-m}$ in multipliers 402 to 412. The results of the multiplication are thereafter added together in an adder 414, as shown in the example of FIG. 1, in order to form an adaptive channel estimate $\hat{c}_k$. This can be presented as follows:

$$\hat{c}_{k,1} = \sum_{i=0}^{M} \alpha_{k,1}(i) \cdot \hat{c}_{k-i,1}.$$

Figure 4:
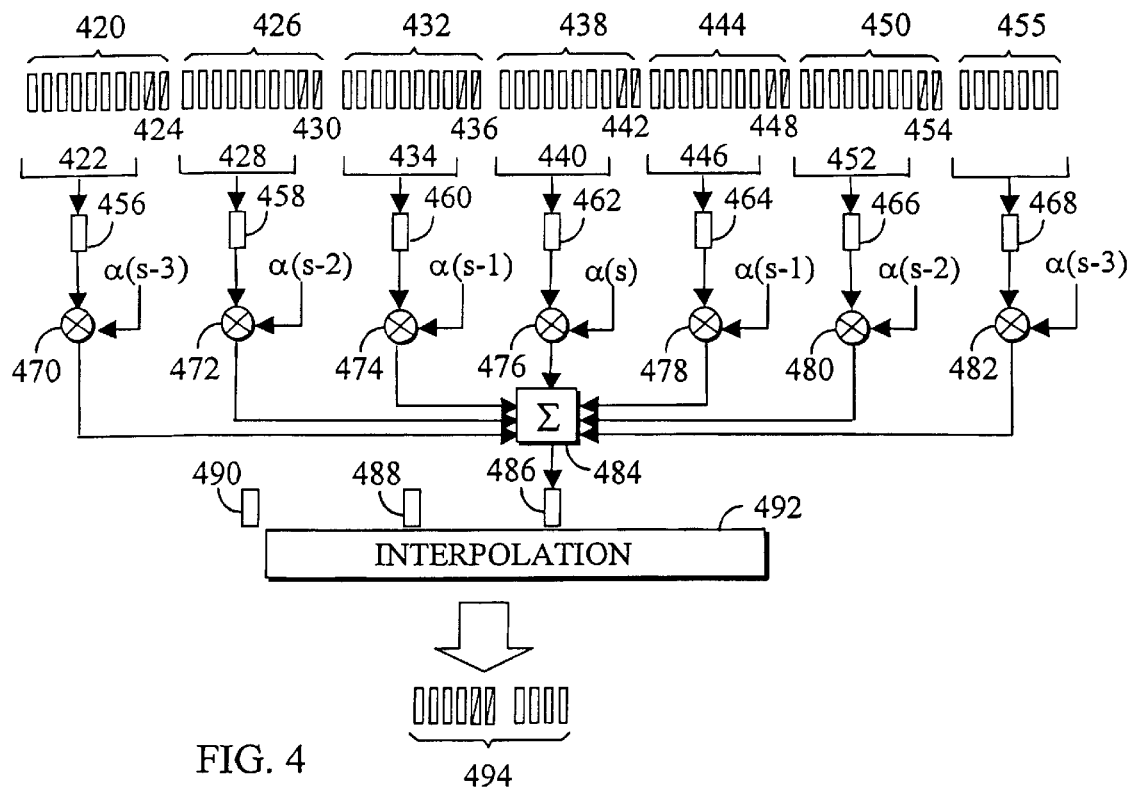
FIG. 4 shows a smoother-type channel estimate filter, which receives eight pilot symbols in one time slot from a control channel.
Figure 5:
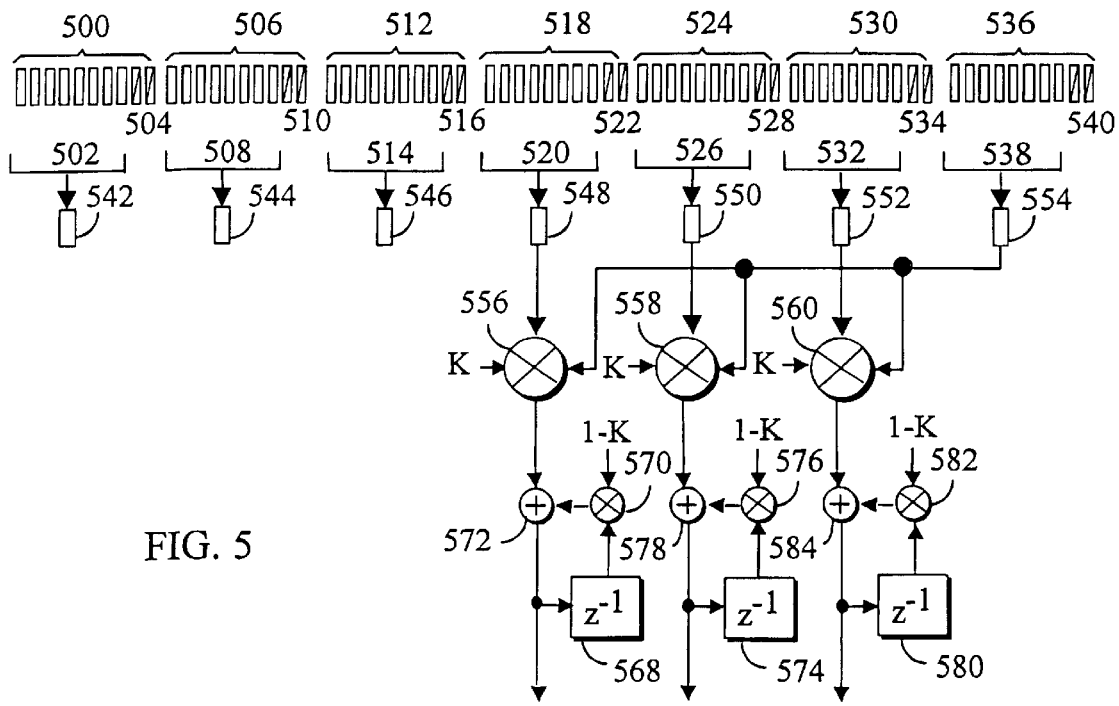
FIG. 5 shows a filter for calculating filter parameters, which receives eight pilot symbols in one time slot from a control channel.

FIGS. 4 and 5 show an arrangement where the rate at which channel estimates are formed is decreased to one tenth, i.e. only one averaged channel estimate is calculated for all the ten symbols in a time slot. Symbol-specific channel estimates are interpolated from the formed time-slot-specific averaged channel estimates. Furthermore, FIGS. 4 and 5 show the operation of the arrangement according to the invention in a case where all the symbols in a control channel time slot are not pilot symbols. FIGS. 4 and 5 show calculation of a channel estimate from seven time slots by way of example. FIG. 4 shows a channel estimator filter. In the arrangement according to the invention the number of time slots can be selected freely. Time slot 420, which comprises ten symbols, has eight pilot symbols 422 and two other symbols 424. Time slot 426 comprises eight pilot symbols 428 and two other symbols 430. Time slot 432 comprises eight pilot symbols 434 and two other symbols 436. Time slot 438 comprises eight pilot symbols 440 and two other symbols 442. Time slot 444 comprises eight pilot symbols 446 and two other symbols 448. Time slot 450 comprises eight pilot symbols 452 and two other symbols 454. Only eight pilot symbols are shown from the last time slot 455. In blocks 456, 458, 460, 462, 464, 466 and 468, the received samples $z_k$ are also multiplied by the corresponding complex conjugates $a_k^*$ of the pilot symbols, as for example in block 100 of FIG. 1. In this arrangement the products of each of the eighth pilot symbols 422, 428, 434, 440, 446, 452 and 455 and the received sample are subjected to smoother filtration for example by adding the products together in respective adders 456, 458, 460, 462, 464, 466 and 468. The summation can also be performed by calculating an average where each symbol in the summation is weighted by a weighting coefficient that is of equal or different value. The obtained preliminary channel estimates c(s−3), c(s−2), c(s−1), c(s), c(s+1), c(s+2) and c(s+3) are weighted by filter parameters $\alpha$(s−3), $\alpha$(s−2), $\alpha$(s−1), $\alpha$(s), $\alpha$(s+1), $\alpha$(s+2) and $\alpha$(s+3) by multiplication in multipliers 470 to 482. In this arrangement data processing is delayed by three time slots in order to provide filtration that is two-sided with respect to the data processing moment. The weighted channel estimates are added together in an adder 484 to obtain average channel estimates 486 to 490 which are successive in time. This means that when the filter arrangement shown in FIG. 4 is in operation, one average channel estimate is continuously formed for each time slot. Between these average channel estimates it is possible to interpolate symbol-specific and sample-specific channel estimates 494 by a linear interpolator 498 in the arrangement according to the invention.

The filter parameters $\alpha$(s−3), $\alpha$(s−2), $\alpha$(s−1), $\alpha$(s), $\alpha$(s+1), $\alpha$(s+2) and $\alpha$(s+3) of the smoother channel estimator filter shown in FIG. 4 are formed for example by a filter parameter filter shown in FIG. 5. Similarly as in FIG. 4, time slot 500 of FIG. 5, which comprises ten symbols, has eight pilot symbols 502 and two other symbols 504. Time slot 506 comprises eight pilot symbols 508 and two other symbols 510. Time slot 512 comprises eight pilot symbols 514 and two other symbols 516. Time slot 518 comprises eight pilot symbols 520 and two other symbols 522. Time slot 524 comprises eight pilot symbols 526 and two other symbols 528. Time slot 530 comprises eight pilot symbols 532 and two other symbols 534. The latest time slot 536 comprises eight pilot symbols 538 and two other symbols 540. Instead of seven time slots, only the four latest time slots 518, 524, 530 and 536 are required for calculating the filter parameters. Smoother filters 542 to 554 operate similarly as the blocks 456 to 468 in FIG. 4. The preliminary channel coefficients c(s−3), c(s−2) and c(s−1) are multiplied by a preliminary channel coefficient c(s) in multipliers 556 to 560 to obtain a preliminary correlation result $\hat{\theta}$(s−3), $\hat{\theta}$(s−2), $\hat{\theta}$(s−1). The preliminary correlation results are filtered in IIR filters by weighting by factor K in multipliers 562 to 566, by adding to the preliminary correlation results in adders 572, 578, 584 the correlation results (1−K)·$\hat{\rho}_{s-3}$(t−1), (1−K)·$\hat{\rho}_{s-2}$(t−1), (1−K)·$\hat{\rho}_{s-1}$(t−1), which have already been filtered and weighted, and which have been obtained by delaying the correlation results in delay blocks 568, 574, 580, and by multiplying the delayed correlation results by factor 1−K in multipliers 570, 576, 582. The filtration provides filter parameters α(s−3), α(s−2), α(s−1). Filter parameter α(s) is formed from the filtered correlation results $\hat{\rho}_{s-2}$ and $\hat{\rho}_{s-1}$ by means of an absolute value sum $|\hat{\rho}_{s-1}+|\hat{\rho}_{s-2}||$, similarly as shown in as shown in FIG. 3. The filter parameters α(s+1), α(s+2) and α(s+3) are preferably formed as complex conjugates of filter parameters α(s−3), α(s−2), α(s−1).

Figure 6:
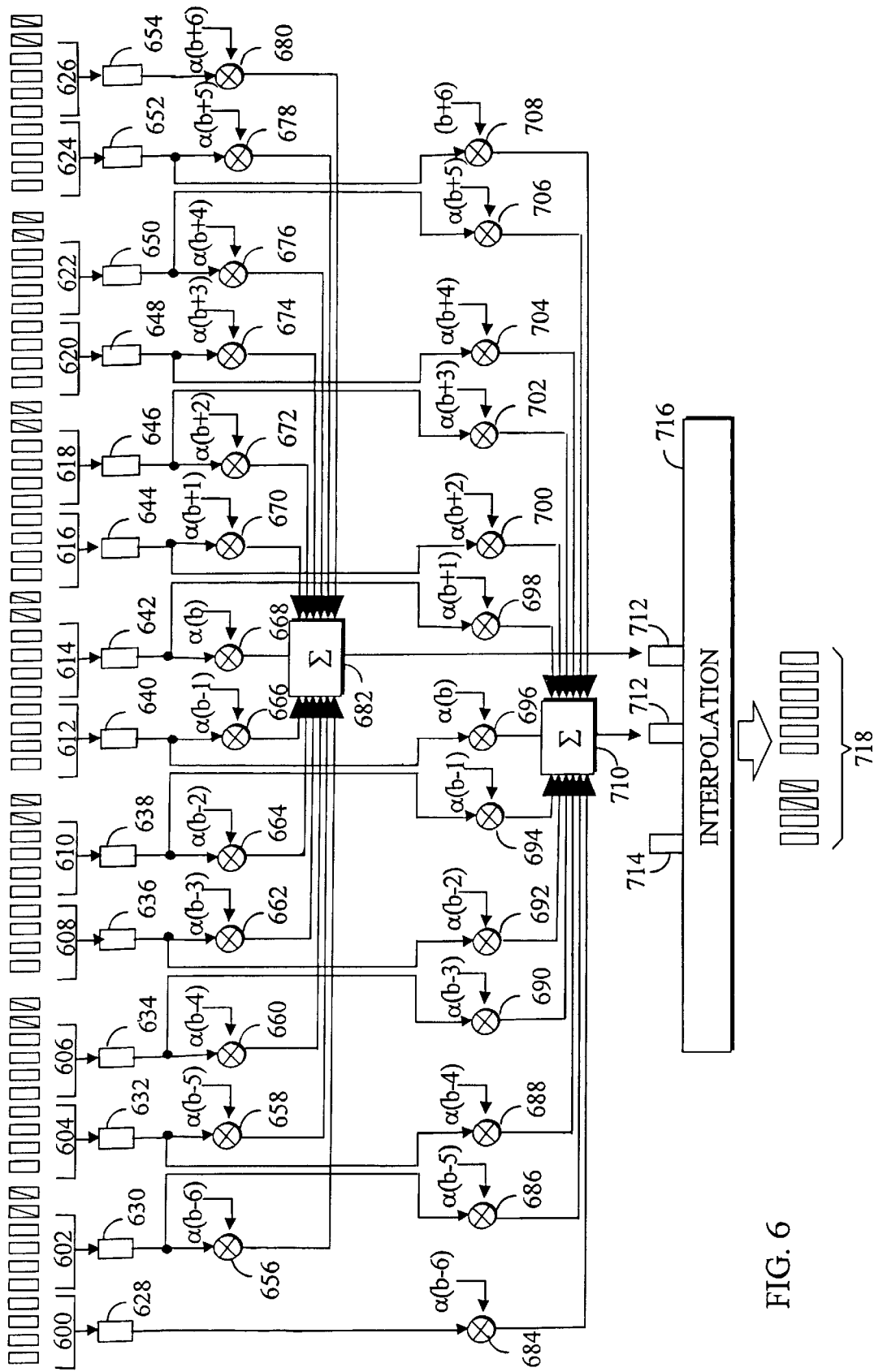
FIG. 6 shows a smoother-type channel estimate filter, which receives four pilot symbols twice in one time slot from a control channel.
Figure 7:
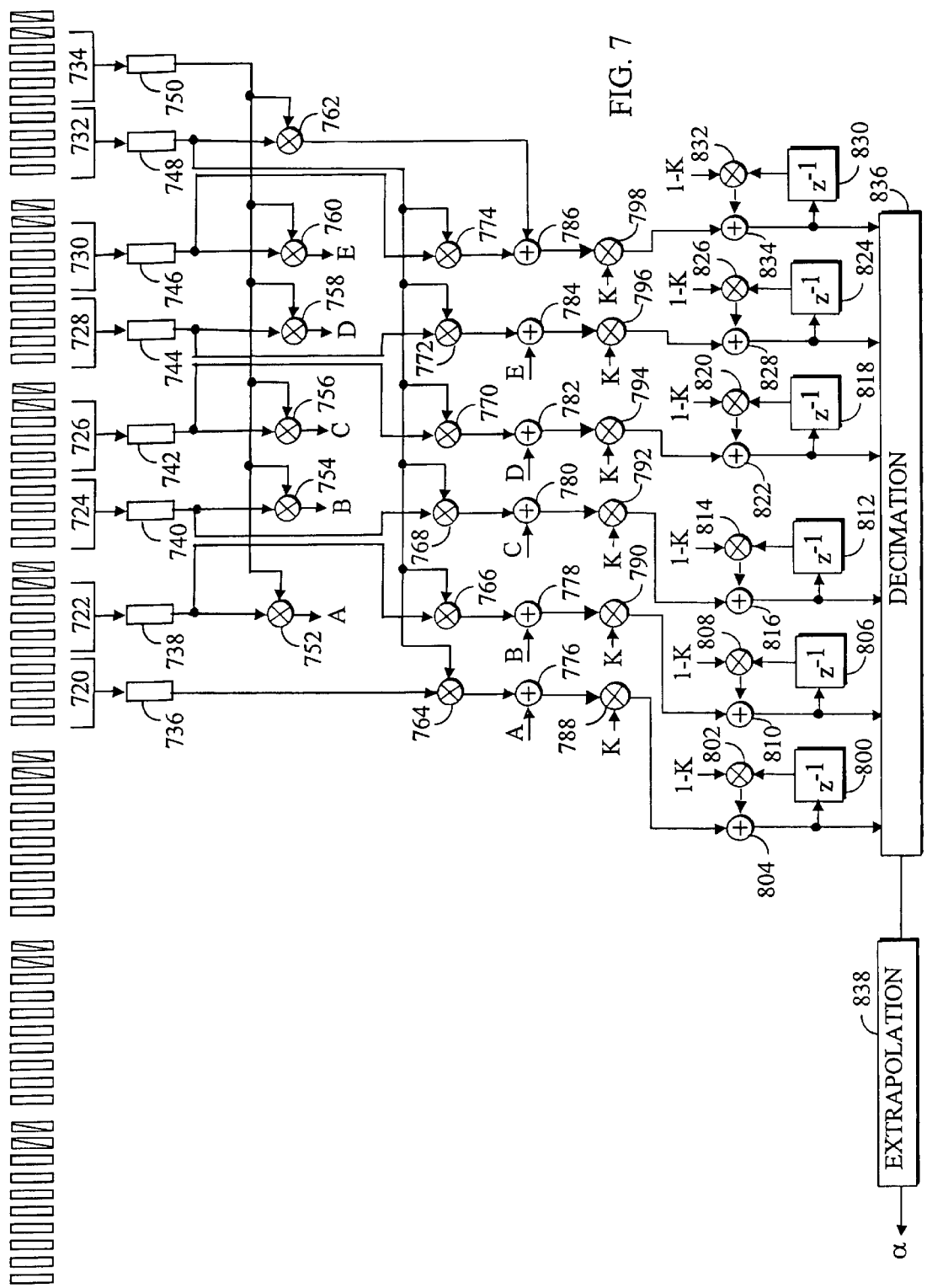
FIG. 7 shows a filter for calculating filter parameters, which receives four pilot symbols twice in one time slot from a control channel.

FIGS. 6 and 7 show an arrangement where the rate at which channel estimates are formed is decreased to one fifth. FIG. 6 shows a similar channel estimator filter as FIG. 4, except that in this case two channel coefficients 712 to 714 are formed in each time slot. This is important for a fast-moving terminal equipment since the estimation error increases significantly when approaching the Nyqvist limit. When only one channel estimate is formed per time slot, the Nyqvist limit is about 800 Hz if the duration of a time slot is about 0.625 ms. The Nyqvist limit corresponds to an approximate speed of 400 km/h. The products of four pilot symbols 600 to 626 and the received samples are combined twice per each time slot in smoother filters 628 to 654. Similarly as the arrangement shown in FIG. 4, this arrangement is also based on smoother filtration where the signal processing is delayed by three time slots in order to provide a time correlation that is two-sided (past-present) with respect to the signal processing moment. The preliminary channel coefficients of each time slot are multiplied in higher multipliers 656 to 680 by filter parameters α(b−6), α(b−5), α(b−4), α(b−3), α(b−2), α(b−1), α(b), α(b+1), α(b+2), α(b+3), α(b+4), α(b+5) and α(b+6), and in lower multipliers 684 to 708 correspondingly by filter parameters α(b−6), α(b−5), α(b−4), α(b−3), α(b−2), α(b−1), α(b), α(b+1), α(b+2), α(b+3), α(b+4), α(b+5) and α(b+6). After the higher multipliers 656 to 680 the products are added together in an adder 682, and after the lower multipliers 684 to 708 the products are added together in an adder 710 to obtain two channel estimates 712 per one time slot (in this case for the time slot comprising pilot symbols 612 and 614). Channel estimates for the time between these two channel estimates 712 are preferably formed by a linear interpolator 716. The interpolator 716 can also be used to interpolate channel estimates between channel estimates 714 of the other time slots and the channel estimates 712 of the present time slot. Interpolated channel estimates are denoted by reference numeral 718.

FIG. 7 shows a filter parameter filter which forms filter parameters α(b−6), α(b−5), α(b−4), α(b−3), α(b−2), α(b−1), α(b), α(b+1). α(b+2), α(b+3), α(b+4), α(b+5) and α(b+6) for the filter shown in FIG. 6. This arrangement does not require all the seven time slots to be used, either. Four pilot symbols 720 to 734 are multiplied by the received samples, whereafter all the four products, which are preliminary channel coefficients, are added together in smoother filters 736 to 750. The channel coefficients related to each of the four pilot symbols 724, 728, 732 (excluding pilot symbols 720) are multiplied in higher multipliers 752 to 762 by a preliminary channel coefficient related to pilot symbols 734 in order to form a preliminary autocorrelation. In lower multipliers 764 to 774, the preliminary channel coefficients (excluding the preliminary channel coefficients related to pilot symbols 734) are multiplied by a channel coefficient related to pilot symbols 732 in order to provide a preliminary autocorrelation. The preliminary autocorrelations are thereafter added together in pairs in adders 776 to 786, and the preliminary autocorrelations which have been added together are subjected to IIR filtration in the manner described in the preceding figures by using weighting coefficient K in multipliers 788 to 798, by means of delaying in delay blocks 800, 806, 812, 818, 824 and 830, by using weighting coefficient 1−K in multipliers 802, 808, 814, 820, 826 and 832, and by using summation in adders 804, 810, 816, 822, 828 and 834. Subsequently each averaged autocorrelation result is decimated in decimators 846, whereafter the decimated results proceed to block 848 for extrapolation (similarly as in block 382 in FIG. 3) and for formation of the filter parameters α(b−6), α(b−5), α(b−4), α(b−3), α(b−2), α(b−1), α(b), α(b+1), α(b+2), α(b+3), α(b+4), α(b+5) and α(b+6). Groups of pilot symbols b−1 720 and b 722 are separated by four pilot symbols in time, whereas pilot symbols b+1 724 and b 722 are separated by six pilot symbols in time. The procedure may be as shown in FIG. 7. When at least two non-sample-specific averaged channel estimates are formed in each time slot, and the pilot symbols in a time slot form at least two symbol groups (e.g. b−1, b and b+1) which are separated in time by a different number of symbols from a pilot symbol group in the same time slot (4 symbols) and in a different time slot (6 symbols), the average autocorrelation of two successive averaged autocorrelations with different distances in time is formed in the adders 776 to 786, and the time delay of the autocorrelation to the signal processing moment is adjusted to an average [(4+6)/2=5] of the distance of the aforementioned two pilot groups from the signal processing moment. This provides averaged correlation results ρ(k−5), ρ(k−10), ρ(k−15), ρ(k−20), ρ(k−25), ρ(k−30), which further require extrapolation (α(b)), decimation and possibly scaling, as also shown in FIG. 3. The averaged correlation results ρ(k−5), ρ(k−10), ρ(k−15), ρ(k−20), ρ(k−25), ρ(k−30) are used to form filter parameters α(b−6), α(b−5), α(b−4), α(b−3), α(b−2), α(b−1), α(b), α(b+1), α(b+2), α(b+3), α(b+4), α(b+5) and α(b+6) by scaling. Filter parameters α(b−6), α(b−5), α(b−4), α(b−3), α(b−2), α(b−1) [α(b+1), α(b+2), α(b+3), α(b+4), α(b+5) and α(b+6)] can be used to form filter parameters α(b+1), α(b+2), α(b+3), α(b+4), α(b+5) and α(b+6) [α(b−6), α(b−5), α(b−4), α(b−3), α(b−2), α(b−1)] as complex conjugates.

The channel estimator of FIGS. 6 and 7 can be presented mathematically as follows. A received sample $z_{k,l}$ is multiplied by a pilot symbol $a_{k,1}^*$ and integrated over four symbols in order to form a preliminary channel estimate $$c|(b), \text{ i.e. } c|(b) = \frac{1}{4}\sum_{k-3}^{k} z_{k,1} \cdot a_{k,1}^*,$$

wherein k is the index of the pilot symbol, b is the time slot index, and I is the path index of a multipath-propagated signal. Two preliminary correlation vectors can be formed for one time slot by means of a preliminary channel estimate. If the latest time slot is denoted by index b, the following time correlation is obtained for the channel estimates:

$\hat{\theta}_1(b)=c_1(b)\cdot[c_1(b-6)*c_1(b-5)*c_1(b-4) \;*c_1(b-3)*c_1(b-2) \;*c_1(b-1)*]$ $\hat{\theta}_1(b-1)=c_1(b-1)\cdot[c_1(b-7)*c_1(b-6)* \;c_1(b-5)*c_1(b-4)*c_1(b-3)*c_1(b-2)*)]$ In order to simplify the calculation of the correlation, the correlation vectors are added together before filtration in a 1-tap IIR filter, i.e. $\hat{\rho}_{l,1\ldots 6}(t)=(1-K)\cdot\hat{\rho}_{l,1\ldots 6}(t-1)+K\cdot(\hat{\theta}_l(b)+\hat{\theta}_l(b-1))$, wherein K is the forgetting factor of the IIR filter, $\hat{\theta}_l(b)$ is a preliminary correlation vector of the channel estimates for time slot b, and $\hat{\rho}_{1\ldots 6}(t)$ is the averaged correlation vector of the channel estimates at moment t. In order to extrapolate the maximum correlation of the channel estimates (as in block 382 of FIG. 3), the following product is formed: $\hat{\rho}_{1,7}(t)=|\hat{\rho}_{1,6}(t)|+\|\hat{\rho}_{1,6}(t)\;|-|\hat{\rho}_{1,5}(t)|\|$.

Figure 8:
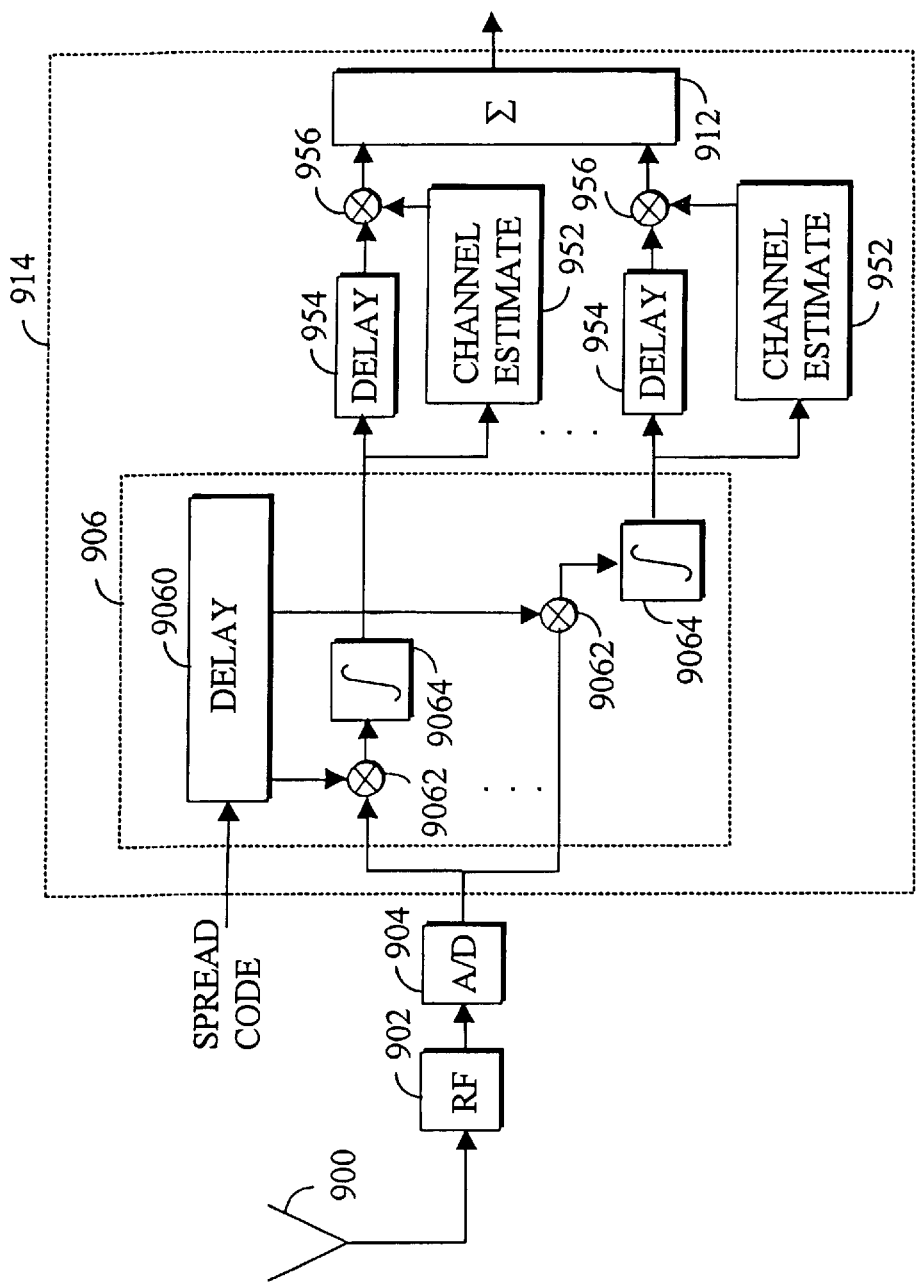
FIG. 8 is a block diagram of a RAKE receiver.

FIG. 8 shows a CDMA receiver comprising RAKE fingers. The receiver comprises an antenna 900 and RF means 902 which convert a signal received by the antenna 900 onto a baseband. The analog baseband signal is converted into a digital signal in an analog-to-digital converter 904. The digital signal proceeds to a RAKE block 914, where the delays of signal components that have propagated via different paths are first determined in a block 906. The signal thereafter propagates to RAKE fingers (comprising blocks 9062, 9064, 954 and 956), each of which is an independent receiver unit. The purpose of the RAKE fingers is to compose and demodulate one received signal component. Each RAKE finger is synchronized with a signal component which has propagated along an individual path, and in the CDMA receiver the signals from the receiver branches are combined in a combiner 912 to obtain a good-quality signal for decoding and other parts of the receiver (not shown in FIG. 8). A signal arriving at a RAKE finger is despread in the block 9062, and the despread signal is integrated for the duration of one symbol in an integrator 9064 to form a sample $z_k$. A channel estimate $\hat{c}_k^*$ is formed in a block 952 by the method according to the invention. In a multiplier 956, the channel estimate $\hat{c}_k^*$ is multiplied by the sample $z_k$ that was delayed in the delay block (the delay corresponds to the time required to form the channel estimate in the block 952) to provide a received symbol. This can be presented as follows: $z_k\hat{c}_k^*=(a_k\cdot c_k+n_k)\cdot\hat{c}_k^*=|c_k|^2\cdot a_k+n_k$, where $|c_k|^2$ is the channel power, $a_k$ is the symbol amplitude, and $n_k$ is noise.

The arrangement according to the invention can be implemented most advantageously by means of microprocessors and a suitable program which executes the required process steps.

Even though the invention is described above with reference to an example according to the accompanying drawings, it is clear that the invention is not restricted thereto but it can be modified in several manners within the scope of the inventive idea disclosed in the appended claims.

What is claimed is:

1. A channel estimation method used in a CDMA radio system comprising at least one base station and several terminal equipments, the at least one base station and the several terminal equipments being configured to communicate with each other by transmitting and receiving signals, the method comprising:

sampling a received signal and transmitting a pilot signal comprising at least one pilot symbol;

forming a preliminary channel estimate by multiplying the sampled signal by a known complex conjugate of the at least one pilot symbol;

forming at least one preliminary autocorrelation result from preliminary channel estimates that are successive in time;

filtering the at least one preliminary autocorrelation by averaging so as to form an averaged autocorrelation result, and forming at least one filter parameter for filtration of an average channel estimate based on the averaged autocorrelation result; and forming the average channel estimate using channel estimate filtration, the channel estimate filtration being controlled by the at least one filter parameter.

2. A method according to claim 1, wherein the forming of the average channel estimate includes FIR-type channel estimate filtration, the preliminary channel estimates being delayed and weighted by the at least one filter parameter.

3. A method according to claim 1, wherein the forming of the at least one filter parameter includes using an IIR filter configured to iteratively add successive preliminary autocorrelation results together to provide the averaged autocorrelation result.

4. A method according to claim 1, wherein the forming of the at least one filter parameter includes FIR filtration, wherein a predetermined number of preliminary autocorrelation results are averaged.

5. A method according to claim 1, further comprising extrapolating a latest averaged autocorrelation result from previous averaged autocorrelation results.

6. A method according to claim 1, wherein each filter parameter is directly the averaged autocorrelation result.

7. A method according to claim 1, wherein the forming of the at least one filter parameter includes scaling averaged autocorrelation results.

8. A method according to claim 7, further comprising performing scaling by dividing a latest averaged autocorrelation result by the sum of previous averaged autocorrelation results.

9. A method according to claim 1, further comprising combining preliminary sample-specific channel estimates into a combined preliminary channel estimate, forming the at least one filter parameter and the average channel estimate based on the combined preliminary channel estimate, and estimating a sample-specific filter parameter and a sample-specific channel estimate using interpolation.

10. A method according to claim 9, further comprising forming averaged autocorrelation results corresponding to the combined preliminary channel estimate, and decimating averaged autocorrelation results in order to form each filter parameter for at least two sampled signals.

11. A method according to claim 10, further comprising decimating the averaged autocorrelation results and, after decimation, extrapolating the latest averaged autocorrelation result from previous averaged autocorrelation results.

12. A method according to claim 1, wherein the forming of the at least one channel estimate is performed per time slot using the at least one pilot symbol contained in the time slot when symbols in a control channel time slot are only partly pilot symbols, and by forming at least one sample-specific averaged channel estimate using interpolation.

13. A method according to claim 1, further comprising forming at least two of the average channel estimates in each time slot, the at least two average channel estimates being non-sample-specific.

14. A method according to claim 13, further comprising forming an average autocorrelation result of two successive averaged autocorrelation results with different time distances when pilot symbols in a time slot form at least two symbol groups with different distances in time from pilot symbol groups in the same time slot and in an adjacent time slot, and adjusting the time distance of the average autocorrelation result to an average of the time distances of the two pilot groups.

15. A method according to claim 1, further comprising delaying processing of the received signal by a predetermined time.

16. A method according to claim 15, wherein the delaying of the processing is delayed by a predetermined number of time slots, and by forming only average channel estimates and filter parameters occurring later than or prior to a signal processing moment, and forming the filter parameters occurring prior to or later than the signal processing moment as complex conjugates of the filter parameters occurring later than or prior to the signal processing moment.

17. A method according to claim 1, further comprising receiving the received signal with a RAKE receiver, and wherein the forming of the average channel estimate includes forming an average channel estimate for each multipath-propagated signal.

18. A receiver in a radio system comprising at least one base station and several terminal equipments, which comprise a transmitter and a receiver and which communicate with each other by transmitting and receiving signals including a pilot signal which comprises at least one pilot symbol, the receiver being arranged to sample a received signal, wherein the receiver is arranged

- to form a preliminary channel estimate by multiplying the sampled signal by a known complex conjugate of the at least one pilot symbol;
- to form at least one preliminary autocorrelation result from preliminary channel estimates that are successive in time;
- to filter the at least one preliminary autocorrelation result by averaging so as to form an averaged autocorrelation result;
- to form at least one filter parameter for filtration of a channel estimate on the basis of the averaged autocorrelation result; and
- to form an average channel estimate by channel estimate filtration which is arranged to be controlled by the at least one filter parameter.

19. A receiver according to claim 18, wherein the receiver is arranged to form the average channel estimate using an FIR-type channel estimate filter, the FIR-type channel estimate filter comprising delay elements for delaying preliminary channel estimates, and multipliers for weighting the preliminary channel estimates by filter parameters.

20. A receiver according to claim 18, wherein the receiver is arranged to form filter parameters from preliminary autocorrelation results using an IIR filter, the IIR filter comprising an adder for iteratively adding together successive preliminary autocorrelation results in order to provide the averaged autocorrelation result.

21. A receiver according to claim 18, wherein the receiver is arranged to form filter parameters from preliminary autocorrelations using an FIR filter, where a predetermined number of preliminary autocorrelations are averaged.

22. A receiver according to claim 18, wherein the receiver is arranged to extrapolate a latest averaged autocorrelation result from previous averaged autocorrelation results.

23. A receiver according to claim 18, wherein the receiver is arranged to form each filter parameter directly using the averaged autocorrelation result.

24. A receiver according to claim 18, wherein the receiver is arranged to form the at least one filter parameter by scaling averaged autocorrelation results.

25. A receiver according to claim 24, wherein the receiver is arranged to perform scaling by dividing the averaged autocorrelation result by the sum of previous averaged autocorrelation results.

26. A receiver according to claim 18, wherein the receiver is arranged to combine more than one sample-specific preliminary channel estimate into a combined preliminary channel estimate, and the receiver is arranged to form the at least one filter parameter and the average channel estimate corresponding to the combined preliminary channel estimate, and the receiver is arranged to estimate a sample-specific filter parameter and a sample-specific channel estimate using interpolation.

27. A receiver according to claim 26, wherein the receiver is arranged to form averaged autocorrelation results corresponding to the combined preliminary channel estimate, and to decimate the averaged autocorrelation results in order to form each filter parameter for at least two sampled signals.

28. A receiver according to claim 27, wherein the receiver is arranged to decimate the averaged autocorrelation results and, after decimation, to extrapolate a latest averaged autocorrelation result from previous averaged autocorrelation results.

29. A receiver according to claim 18, wherein when the symbols in a control channel time slot are only partly pilot symbols, the receiver is arranged to form at least one channel estimate per time slot using the pilot symbols contained in the time slot, and to form at least one sample-specific averaged channel estimate using interpolation.

30. A receiver according to claim 18, wherein the receiver is arranged to form at least two non-sample-specific averaged channel estimates in each time slot.

31. A receiver according to claim 30, wherein when pilot symbols in a time slot form at least two symbol groups with difference distances in time from pilot symbol groups in the same time slot and in an adjacent time slot, the receiver is arranged to form an average autocorrelation result of two successive averaged autocorrelation results with different time distances, and the receiver is arranged to adjust the time distance of the average autocorrelation result to an average of the time distances of the two pilot groups.

32. A receiver according to claim 18, wherein the receiver is arranged to delay processing of the received signal by a predetermined time.

33. A receiver according to claim 32, wherein the receiver is arranged to delay the processing of the received signal by a predetermined number of time slots, and the receiver is arranged to form only averaged channel estimates and filter parameters occurring later than or prior to a signal processing moment, and the receiver is arranged to form the filter parameters occurring prior to or later than the signal processing moment as complex conjugates of the filter parameters occurring later than or prior to the signal processing moment.

34. A receiver according to claim 18, wherein the receiver is a RAKE receiver arranged to form an average channel estimate for each multipath-propagated signal.

* * * * *